United States Patent
Vadlamudi et al.

(10) Patent No.: US 11,953,391 B2
(45) Date of Patent: Apr. 9, 2024

(54) DIFFERENTIAL PRESSURE SENSOR AND METHOD OF USING THE SAME

(71) Applicant: Honeywell International Inc., Charlotte, NC (US)

(72) Inventors: Sathish Vadlamudi, Nellore (IN); Manjesh Kumar B, Bangalore (IN); Sudheer Beligere Sreeramu, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/048,385

(22) Filed: Oct. 20, 2022

(65) Prior Publication Data

US 2023/0058515 A1    Feb. 23, 2023

Related U.S. Application Data

(63) Continuation of application No. 17/065,286, filed on Oct. 7, 2020, now Pat. No. 11,506,557.

(51) Int. Cl.
*G01L 9/00* (2006.01)
*G01L 13/02* (2006.01)
(Continued)

(52) U.S. Cl.
CPC .......... *G01L 13/025* (2013.01); *G01L 9/0052* (2013.01); *G01L 19/0627* (2013.01); *G01L 19/147* (2013.01)

(58) Field of Classification Search
None
See application file for complete search history.

(56) References Cited

U.S. PATENT DOCUMENTS 6,550,339 B1 * 4/2003 Toyoda ................. G01L 19/146
                                                            73/716
7,162,927 B1 * 1/2007 Selvan .................. G01L 19/143
                                                            73/756
(Continued)

FOREIGN PATENT DOCUMENTS

DE    102009027132 A1    12/2010
EP         3205995 A1     8/2017
WO     2020/126196 A1     6/2020

OTHER PUBLICATIONS

Extended European search report dated Feb. 15, 2022 for EP Application No. 21201335, 8 pages.
(Continued)

*Primary Examiner* — Brandi N Hopkins
*Assistant Examiner* — Nigel H Plumb
(74) *Attorney, Agent, or Firm* — Alston & Bird LLP

(57) ABSTRACT

Various embodiments are directed to a pressure sensor and method of using the same. A pressure sensor may comprise a substrate having a substrate thickness extending between a first substrate surface and a second substrate surface, wherein the first substrate surface and the second substrate surface define opposing ends of the substrate thickness; a first pressure sensing assembly attached to the first substrate surface and configured to detect a first pressure force associated with a first fluid volume, wherein a portion of the first substrate surface adjacent the first pressure sensing assembly is fluidly isolated from the first volume of fluid; and a second pressure sensing assembly attached to the second substrate surface and configured to detect a second pressure force associated with a second volume of fluid, wherein a portion of the second substrate surface adjacent the second pressure sensing assembly is fluidly isolated from the second fluid volume.

19 Claims, 4 Drawing Sheets

(51) Int. Cl.
      *G01L 19/06*       (2006.01)
      *G01L 19/14*       (2006.01)

(56) References Cited

U.S. PATENT DOCUMENTS

| | | | | |
|---|---|---|---|---|
| 8,230,745 | B2* | 7/2012 | Rozgo | G01L 13/025 |
| | | | | 73/753 |
| 11,506,557 | B2* | 11/2022 | Vadlamudi | G01L 13/025 |
| 2009/0218643 | A1* | 9/2009 | Kaminaga | G01L 19/0038 |
| | | | | 257/E29.141 |
| 2010/0327883 | A1* | 12/2010 | Reinmuth | G01L 9/0072 |
| | | | | 324/681 |
| 2012/0042734 | A1* | 2/2012 | Wade | G01L 19/143 |
| | | | | 29/527.1 |

OTHER PUBLICATIONS

Honeywell, "ABP2 Series Board Mount Pressure Sensors", May 2020, [brochure, online], [retrieved Dec. 31, 2020], retrieved from the Internet <URL: https://www.sager.com/_resources/common/userfiles/file/Datasheets/Honeywell/Honeywell_ABP2_Series_Datasheet.pdf>, 23 pages.
Non-Final Office Action received for U.S. Appl. No. 17/065,286, dated Apr. 8, 2022, 11 pages.
Notice of Allowance received for U.S. Appl. No. 17/065,286, dated Jul. 20, 2022, 9 pages.
U.S. Appl. No. 17/065,286, filed Oct. 7, 2020, U.S. Pat. No. 11,506,557, Issued.
EP Office Action dated Feb. 5, 2024 for EP Application No. 21201335, 4 page(s).

\* cited by examiner

DIFFERENTIAL PRESSURE SENSOR AND METHOD OF USING THE SAME

CROSS-REFERENCE TO RELATED APPLICATIONS

This application is a continuation of a U.S. non-provisional patent application Ser. No. 17/065,286, entitled "Differential Pressure Sensor And Method Of Using The Same" and filed on Oct. 7, 2020, which is herein incorporated by reference in its entirety.

FIELD OF THE INVENTION

Various embodiments described herein relate generally to pressure sensors. In particular, various embodiments are directed to pressure sensors configured for measuring a pressure differential between two environments.

BACKGROUND

Industrial, commercial, and medical applications may use differential pressure sensors to determine, for comparison, one or more fluid conditions within each of two distinct environments fluidly. In particular, a pressure differential sensor may be utilized to characterize a fluid flow condition and/or a pressure drop that exists between two distinct environments. Through applied effort, ingenuity, and innovation, Applicant has solved problems relating to differential pressure sensors by developing solutions embodied in the present disclosure, which are described in detail below.

BRIEF SUMMARY

Various embodiments are directed to a differential pressure sensor and method of using the same. In various embodiments, a pressure sensor may comprise: a pressure sensor comprising: a substrate defined in part by a substrate thickness extending between a first substrate surface and a second substrate surface, wherein the first substrate surface and the second substrate surface define opposing ends of the substrate thickness; a first pressure sensing assembly attached to the first substrate surface and configured to detect a first pressure force associated with a first volume of fluid, wherein at least a portion of the first substrate surface to which the first pressure sensing assembly is attached is fluidly isolated from the first volume of fluid; and a second pressure sensing assembly attached to the second substrate surface and configured to detect a second pressure force associated with a second volume of fluid, wherein at least a portion of the second substrate surface to which the second pressure sensing assembly is attached is fluidly isolated from the second volume of fluid.

In various embodiments, a pressure sensor may further comprise a controller in electronic communication with the first pressure sensing assembly and the second pressure sensing assembly, the controller may be further configured to receive a first output signal from the first pressure sensing assembly and a second output signal from the second pressure sensing assembly. In various embodiments, the controller is further configured to determine a pressure differential associated with the first pressure sensing assembly and the second pressure sensing assembly based at least in part on the first output signal and the second output signal. In certain embodiments, the controller may be in electronic communication with the substrate, and wherein the controller is disposed within one of a first sensor housing and a second sensor housing and secured relative to the substrate.

In various embodiments, the first pressure sensing assembly may comprise a first pressure sensing element positioned at least substantially adjacent the first substrate surface and configured to detect the first pressure force; and the second pressure sensing assembly may comprise a second pressure sensing element positioned at least substantially adjacent the second substrate surface and configured to detect the second pressure force. In certain embodiments, the first pressure sensing element may be in electronic communication with a controller, and the first pressure sensing element may be configured to transmit a first output signal to the controller in response to detecting the first pressure force; and the second pressure sensing element may be in electronic communication with the controller, and the second pressure sensing element may be configured to transmit a second output signal to the controller in response to detecting the second pressure force. In various embodiments, the substrate may comprise a printed control board (PCB). In certain embodiments, the first pressure sensing assembly may comprise a first pressure sensing element in electronic communication with the first substrate surface and configured to detect the first pressure force; and wherein the second pressure sensing assembly may comprise a second pressure sensing element in electronic communication with the second substrate surface and configured to detect the second pressure force. Further, in certain embodiments, the first pressure sensing element may be configured to receive the first pressure force at a first receiving surface, and the second pressure sensing element may be configured to receive the second pressure force at a second receiving surface; wherein the first receiving surface is arranged so as to face a substantially opposite direction as the second receiving surface.

In various embodiments, a pressure sensor may further comprise a first sensor housing and a second sensor housing; wherein the first sensor housing and the portion of the first substrate surface to which the first pressure sensing assembly is attached may collectively define a first internal pressure chamber configured to house the first volume of fluid; and the second sensor housing and the portion of the second substrate surface to which the second pressure sensing assembly is attached may collectively define a second internal pressure chamber configured to house the second volume of fluid.

In various embodiments, the first pressure sensing assembly may comprise a first force transmitting member disposed within the first sensor housing and configured to receive the first pressure force; and the second pressure sensing assembly may comprise a second force transmitting member disposed within the second sensor housing and configured to receive the second pressure force. In certain embodiments, the first pressure sensing assembly may further comprise a first pressure sensing element disposed within the first sensor housing, wherein the first force transmitting member is configured to transfer at least a portion of the first pressure force to the first pressure sensing element, and wherein the first force transmitting member is configured to at least substantially surround the first pressure sensing element so as to fluidly isolate the first pressure sensing element from the first volume of fluid. In certain embodiments, the second pressure sensing assembly may further comprise a second pressure sensing element disposed within the second sensor housing, wherein the second force transmitting member is configured to transfer at least a portion of the second pressure force to the second pressure sensing element, and wherein the second force transmitting member is configured to at least substantially surround the second pressure sensing element so as to fluidly isolate the second pressure sensing element from the second volume of fluid. In various embodiments, the first force transmitting member may comprise a first volume of gel; and the second force transmitting member may comprise a second volume of gel. In various embodiments, the first volume of gel may comprise a food-grade gel; and the first sensor housing may be secured relative to the first substrate surface using a food-grade adhesive.

Various embodiments described herein are directed to a method of determining a pressure differential, the method comprising: providing a pressure sensor comprising: a substrate defined in part by a substrate thickness extending between a first substrate surface and a second substrate surface, wherein the first substrate surface and the second substrate surface define opposing ends of the substrate thickness; a first pressure sensing assembly attached to the first substrate surface and configured to detect a first pressure force associated with a first volume of fluid, wherein at least a portion of the first substrate surface to which the first pressure sensing assembly is attached is fluidly isolated from the first volume of fluid; and a second pressure sensing assembly attached to the second substrate surface and configured to detect a second pressure force associated with a second volume of fluid, wherein at least a portion of the second substrate surface to which the second pressure sensing assembly is attached is fluidly isolated from the second volume of fluid; receiving a first output signal from the first pressure sensing assembly and a second output signal from the second pressure sensing assembly; and determining a pressure differential associated with the first pressure sensing assembly and the second pressure sensing assembly based at least in part on the first output signal and the second output signal.

In various embodiments, the pressure sensor may further comprise a controller in electronic communication with the substrate, and wherein the controller is disposed within one of a first sensor housing or a second sensor housing and secured relative to the substrate. In various embodiments, the first pressure sensing assembly may comprise a first pressure sensing element positioned at least substantially adjacent the first substrate surface and configured to detect the first pressure force; and wherein the second pressure sensing assembly comprises a second pressure sensing element positioned at least substantially adjacent the second substrate surface and configured to detect the second pressure force. In various embodiments, the first pressure sensing assembly may comprise a first force transmitting member disposed within a first sensor housing and configured to receive the first pressure force; and wherein the second pressure sensing assembly comprises a second force transmitting member disposed within a second sensor housing and configured to receive the second pressure force.

Various embodiments described herein are directed to a pressure sensor comprising: a substrate defined in part by a substrate thickness extending between a first substrate surface and a second substrate surface; a first pressure sensing assembly attached to the first substrate surface and configured to detect a first pressure force associated with a first volume of fluid, wherein at least a portion of the first substrate surface to which the first pressure sensing assembly is attached is fluidly isolated from the first volume of fluid; and a second pressure sensing assembly attached to the second substrate surface and configured to detect a second pressure force associated with a second volume of fluid, wherein at least a portion of the second substrate surface to which the second pressure sensing assembly is attached is fluidly isolated from the second volume of fluid; wherein the first substrate surface and the second substrate surface define coplanar surfaces such that the first pressure sensing assembly and the second pressure sensing assembly are laterally distanced apart within an at least substantially similar plane.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
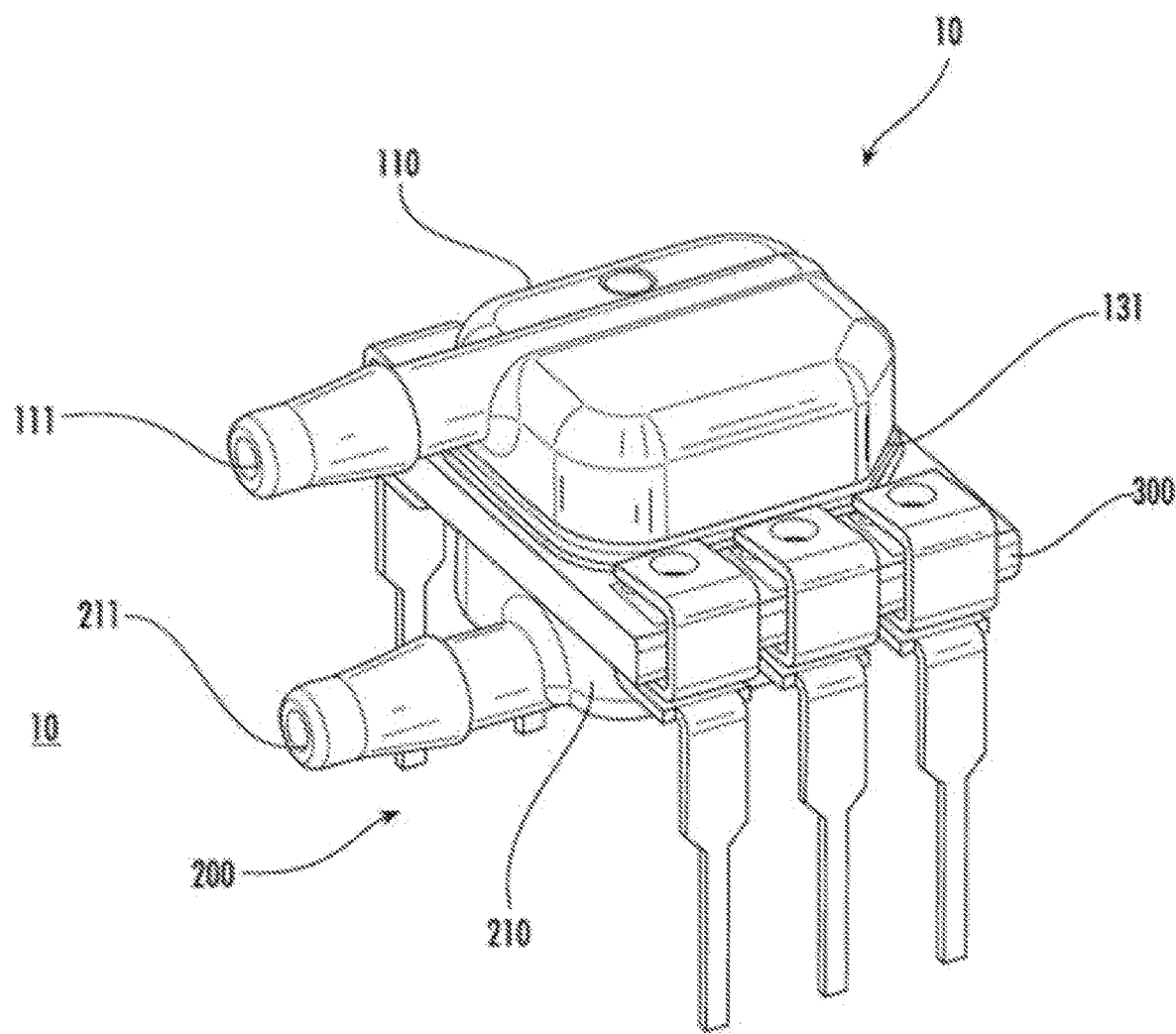
FIG. 1 illustrates a perspective view of an exemplary pressure sensor according to an embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

The words "example," or "exemplary," when used herein, are intended to mean "serving as an example, instance, or illustration." Any implementation described herein as an "example" or "exemplary embodiment" is not necessarily preferred or advantageous over other implementations. As used herein, a "fluid" may be embodied as a gas, a liquid, or a combination of a gas and a liquid in a single flow. Thus, the term "fluid" encompasses various materials subject to flow, such as, but not limited to, liquids and/or gases (e.g., water, oil, air, and/or the like). Thus, various embodiments are directed to fluid sensing systems, such as gas sensor systems (e.g., certain embodiments being specifically configured for operation with air; other embodiments being configured for operation with other gases, such as inert gases, volatile gases, and/or the like), liquid sensor systems, and/or the like.

Sensors, such as pressure sensors and/or flow sensors, may be used in a wide variety of diverse applications throughout various industries to sense the pressure and/or flow of a media (e.g. gas or liquid) in a fluid channel. In particular, differential pressure sensors may be used to characterize an ambient and/or localized condition within an environment based on a comparison of at least two data points collected at fluidly distinct ports of the pressure sensor. For example, differential pressure sensors may be utilized to characterize various fluid flow characteristics, pressure drop conditions, and/or the like in industrial contexts such as automotive engine calibration, medical device monitoring, consumer beverage supply systems, oil and gas processing, and the like. Various differential pressure sensors may include a plurality of fluidly distinct pressure ports, each fluidly connected to a respective volume and/or flow of media such that that pressure sensor may mechanically and/or electronically determine the difference in pressure between a first and a second pressure port of the sensor. In more modern applications, differential pressure sensors may include one or more processing components configured to facilitate data collection at the various pressure ports and, further, may be utilized to identify a desired output value of the pressure sensor (e.g., pressure drop, flow rate, and/or the like). For example, a differential pressure sensor may include various electronic components disposed within and/or adjacent the respective pressure ports and configured to collect fluid data measurements based at least in part on a physical engagement with a volume of fluid corresponding to the respective pressure port. In light of the aforementioned broad applicability of differential pressure sensors and the inherent plurality of the multiple pressure ports defined within a differential pressure sensor, the various electronic components utilized in such sensors may be exposed to a vast array of fluid configurations. For example, a differential pressure sensor may be utilized in an application wherein a volume of gas is measured at each of the two pressure ports, or wherein a volume of gas is measured at a first pressure port and a volume of liquid is measured at a second pressure port. In such an exemplary circumstance, the various electronic components disposed within the sensor, such as, for example, a printed control board (PCB), may be contacted by the volume of liquid being measured at the second pressure port of the sensor. Such physical interaction between electronic components of the pressure sensor and the subject volume(s) of liquid being measured may result in the gradual and/or instantaneous deterioration of the sensor's electronic components, such as, for example, the etching of the PCB and/or a short-circuit developing within sensor's circuitry.

Various differential pressure sensors may incorporate methods of protecting a portion of the sensor's electronic components from exposure to subject fluids engaged therewith that may be considered to be detrimental to the performance of the particular electronic component or the pressure sensor as a whole. For example, various differential pressure sensors may be configured to protect (e.g., via spatial isolation) a portion of the electronic components that engage the volume of harmful fluids (e.g., liquids) at one of the plurality of pressure ports defined by the sensor. However, such a sensor configuration is unable to accommodate a "wet/wet" and/or "harsh media environment" wherein the volumes of fluid disposed within the first and second pressure ports of the differential pressure sensor each comprise a volume of liquid and/or other media that may harm electronic components of the sensor. Various differential pressure sensors may incorporate one or more protection measures intended to protect the various electronic sensor components from interaction with a harmful volume of fluid, however various sensor embodiments designed to spatially isolated the sensor's electronic components may result in a sensor having a bulky and/or complex design, thereby causing an undesirably bulky sensor configuration having a large physical footprint and increased manufacturing costs.

Described herein is a differential pressure sensor configured to efficiently and effectively operate in a "wet/wet" condition without compromising the performance, cost, or minimized physical footprint of the pressure sensor. In some examples, the pressure sensor includes a first sensor portion and a second sensor portion, each of which are secured to opposing sides of a substantially planar substrate, such as, for example, a PCB. Both the first and the second sensor portions include a respective housing secured in a sealed configuration relative to the corresponding side of the PCB and configured such that the sensor housing and the substrate surface to which it is attached collectively define an interior pressure chamber. As described herein, each interior pressure chamber may be configured to receive a volume of fluid from a respective fluid supply (e.g., via a fluid inlet within the corresponding sensor housing) such that the first and second interior pressure chambers each define a distinct pressure port of the pressure sensor. Further, each of the two opposing sensor portions includes a respective pressure sensing assembly disposed at least partially within the respective interior pressure chamber arranged on each of the opposing sides of the substrate, each pressure sensing assembly including a pressure sensing element secured to the corresponding substrate surface and configured to sense a local pressure within the corresponding interior pressure surface. Further, in various embodiments, the first and second pressure sensing assemblies are configured to protect the various circuitries disposed about the opposing substrate surfaces using respective force transmitting members, such as, for example, a fluorosilicone gel. As described herein, each force transmitting member may at least partially surround a corresponding pressure sensing element and adjacent substrate surface, so as to function as a barrier isolating the aforementioned electronic components from physical contact with fluid (e.g., liquid) disposed within an adjacent interior pressure chamber. The first pressure sensing element of the first sensor portion and the second pressure sensing element of the second sensor portion may be configured to detect a pressure within the first interior pressure chamber and the second interior pressure chamber, respectively. In such an exemplary configuration both the first and second pressure sensing elements may be configured to transmit an output signal to a controller that is electronically connected to each pressure sensing element and configured to process each of the two output signals to determine a pressure differential between the respective sensor portions.

In various embodiments, the invention described herein is further configured to facilitate a compact sensor design capable of being produced with minimized manufacturing costs. As described, the configuration of the first sensor portion—defining the first pressure port of the sensor—and the second sensor portion—defining the second pressure port of the sensor—on opposing surfaces of a singular substrate enables a substantially consolidated sensor configuration that avoids an unnecessarily bulky configuration and results in a minimized physical footprint. Such a configuration further facilitates a minimized number of physical parts required to produce the described pressure sensor, while simultaneously enabling a pressure differential measurement between two distinct ambient environments that collectively define a "wet/wet" operation condition.

As illustrated in FIG. 1, in various embodiments, a pressure sensor 10 may comprise a first sensor portion 100 and a second sensor portion 200 that are configured to receive a volume of fluid from a first fluid supply (e.g., a first ambient environment or a first fluid source) and a second fluid supply, respectively, such that the pressure sensor 10 is configured to detect the respective pressures of the first and second fluid supplies and determine a comparative pressure differential that exists therebetween. In various embodiments, the pressure sensor 10 may comprise a substrate 300 having a first surface (e.g., a front side) and a second surface (e.g., a back side). In various embodiments, the first and second sensor portions 100, 200 may be positioned on opposing surfaces of the substrate 300 such that the substrate 300 may function as a barrier configured to fluidly isolate the first sensor portion 100 from the second sensor portion 200. As described herein, the first and second fluid portions may each comprise a sensor housing configured to effectively engage a respective surface of the substrate 300 so as to define an internal pressure chamber extending therebetween, and a pressure sensing assembly configured to protect the electrical components disposed within sensor housing from the volume of fluid received within the housing and sense a pressure within the corresponding interior pressure chamber. In such an exemplary circumstance, the first sensor portion 100 and the second sensor portion 200 may each include an interior pressure chamber defined at least in part by the internal volumes formed between the respective sensor housings 110, 210 and the surfaces of the substrate 300 to which the sensor housings 110, 210 are respectively secured. An exemplary pressure sensor 10 comprising a first sensor portion 100 and a second sensor portion 200 arranged about respective opposite parallel surfaces of the same planar substrate 300, each of sensor portion 100, 200 comprising a pressure sensing assembly configured to sense a pressure within the corresponding interior pressure chamber while facilitating the protection of various electrical components disposed within sensor portion from physical contact with the volume of fluid received within the respective housing, may be configured to facilitate increased sensor performance and a substantially consolidated sensor configuration resulting in pressure sensor 10 having an increased lifespan and a minimized physical footprint.

Figure 2:
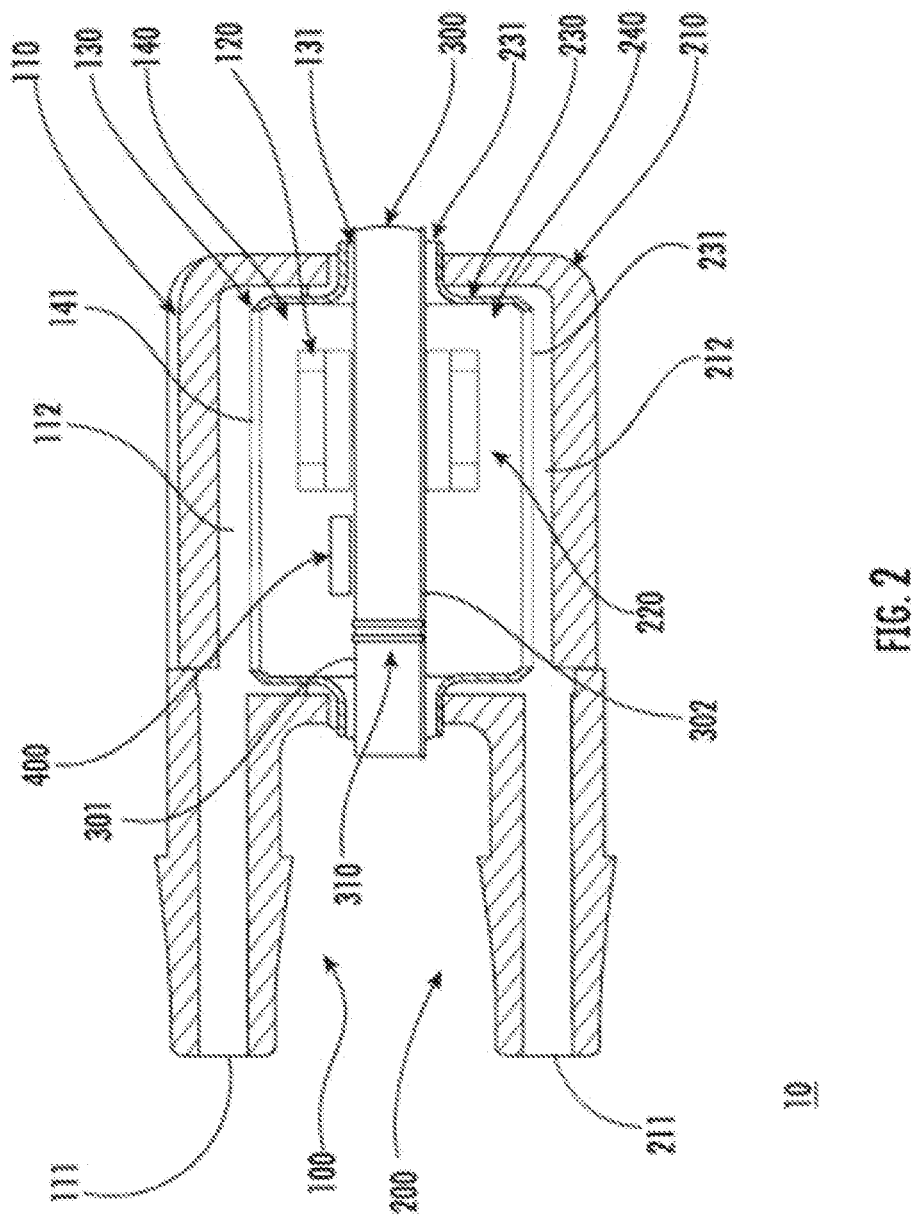
FIG. 2 illustrates a cross-sectional view of an exemplary pressure sensor according to an embodiment.
Figure 3:
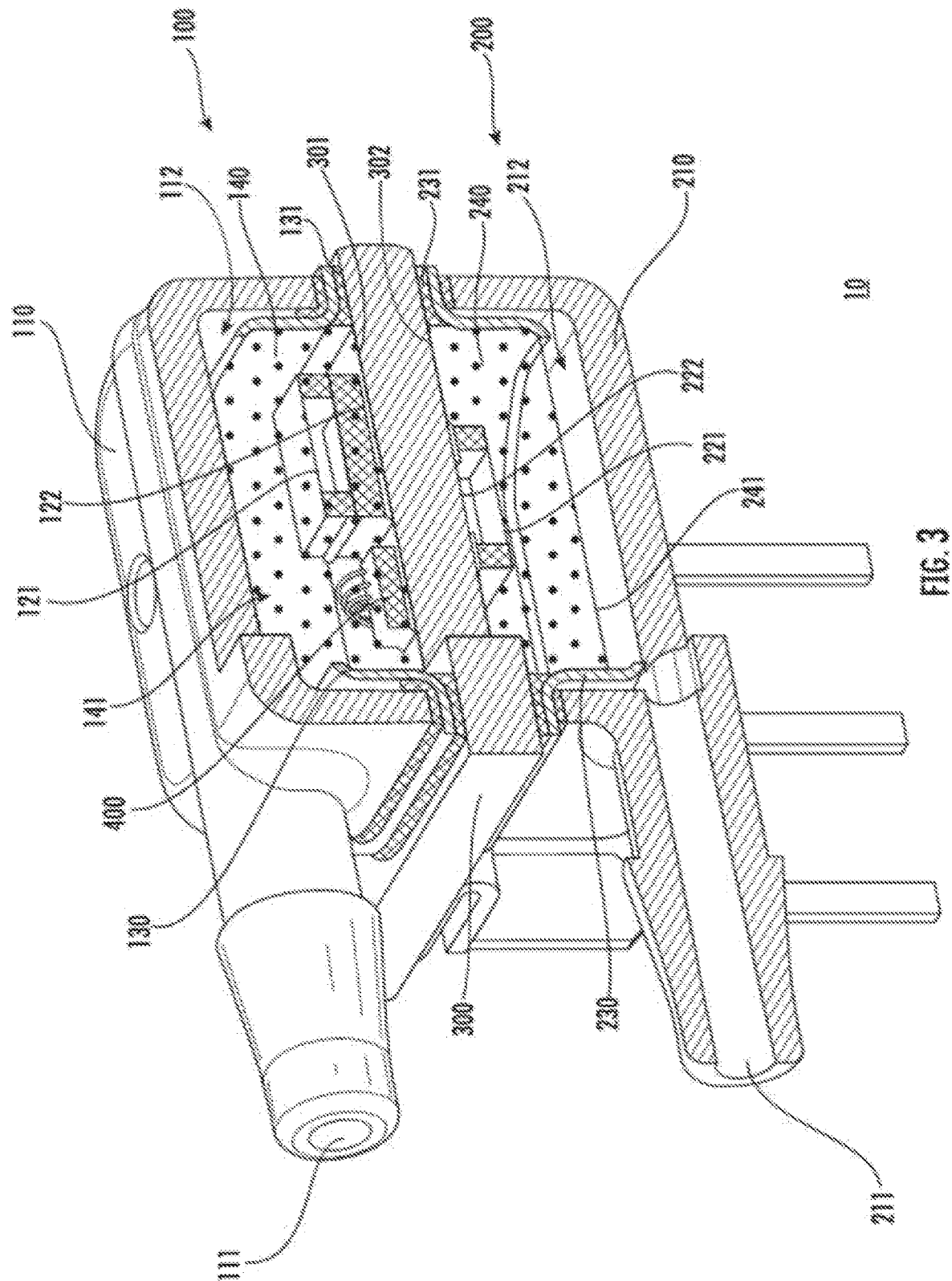
FIG. 3 illustrates a perspective cut-away view of an exemplary pressure sensor according to an embodiment.

As described herein, an exemplary pressure sensor 10 may comprise at least one housing that defines an exterior of at least a portion of the pressure sensor and an interior portion within which various pressure sensor components described herein may be disposed. As shown in FIGS. 2-3, the first and second sensor portions 100, 200 of the pressure sensor may comprise a first sensor housing 110 and a second sensor housing 210, respectively, each defining a portion of the exterior of the pressure sensor 10. In various embodiments, each sensor housing 110, 210 may comprise one or more sidewalls arranged so as to define a respective interior housing portion therein. Further, the one or more sidewalls of the sensor housing may define a lower circumferential surface extending around an outer perimeter of one side of the interior housing portion so as to define an opening at the one side of the interior housing portion through which the one or more pressure sensor components attached to a surface of the substrate 300, as described herein, may extend when the sensor housing is mounted relative to the substrate 300. In various embodiments, the lower circumferential surface may extend along a singular plane such that the sensor housing may effectively engage a flat, planar surface of a substrate 300 (e.g., a first substrate surface or a second substrate surface) at the lower circumferential surface in order to facilitate the mounting of the sensor housing relative to the substrate 300.

For example, as illustrated, the first sensor housing 110 may be effectively secured to first substrate surface 301 of substrate 300 along the lower circumferential surface of the housing 110, which may extend along a plane that is at least substantially parallel to the first surface 301 of the substrate 300. In such a configuration, the first sensor housing 110 and the substrate 300 may collectively define a first interior pressure chamber 112 enclosed between the first sensor housing 110 and the first surface 301 of the substrate 300. Further, the second sensor housing 210 of the second sensor portion 200 of the pressure sensor 10 may be effectively secured to a second surface 302 of substrate 300 along the lower circumferential surface of the housing 210, which may extend along a plane that is at least substantially parallel to the second surface 302 of the substrate 300. In such a configuration, the second sensor housing 210 and the substrate 300 may collectively define a second interior pressure chamber 212 enclosed between the second sensor housing 210 and the second surface 302 of the substrate 300. As described herein, the first sensor housing 110 may be secured relative to the first surface 301 of the substrate 300 such that one or more pressure sensor elements secured to the first substrate surface 301 may extend into the first interior pressure chamber 112. Similarly, the second sensor housing 210 may be secured relative to the second surface 302 of the substrate 300 such that one or more pressure sensor elements secured to the second substrate surface 302 may extend into the second interior pressure chamber 212.

In various embodiments, the first sensor portion 100 and second sensor portion 200 may each comprise a fluid inlet that is defined at least in part by the respective sensor housing. For example, each sensor housing sensor housing 110, 210 may include a fluid inlet (e.g., first fluid inlet 111, second fluid inlet 211) that is configured to receive a volume of fluid from a respective ambient environment so as to facilitate the fluid communication between the respective ambient environment and the corresponding internal pressure chamber 112, 212. In such an exemplary configuration, as illustrated in FIG. 2, the pressure sensor 10 may be configured such that a first pressure within the first interior pressure chamber 112 may correspond to the ambient pressure within a first ambient environment fluidly connected to the first fluid inlet 111, and a second pressure within the second interior pressure chamber 212 may correspond to the ambient pressure within a second ambient environment fluidly connected to the second fluid inlet.

In various embodiments, the pressure sensor 10 may comprise a substrate 300 comprising a first substrate surface 301 and a second substrate surface 302. As illustrated in FIGS. 102, the first and second substrate surface 301, 302 may define opposite sides of the substrate 300 with the substrate thickness extending therebetween. For example, the first substrate surface 301 may be defined as a top substrate surface configured to face in a first direction, and the second substrate surface 302 may be defined as a bottom substrate surface configured to face in a second direction that is opposite to the first direction. As described in further detail herein, an exemplary pressure sensor 10 may comprise a first sensor portion 100 and a second sensor portion 200 that are arranged about the first substrate surface 301 and the second substrate surface 302, respectively, such that the first and second sensor portions 100, 200 of the pressure sensor 10, each of which are configured to detect a respective local pressure that corresponds to the ambient pressure within distinct ambient environments, are configured on opposing sides of a single substrate 300. Such an exemplary configuration, wherein a portion of each of a first sensor portion 100 and a second sensor portion 200, as described herein, are defined by opposing surfaces of a singular substrate 300 facilitates a substantially consolidated sensor configuration corresponding to a minimized physical footprint and a minimized number of physical parts required to produce pressure sensor 10 configured to determine a pressure differential between two distinct ambient environments.

In various embodiments, the substrate 300 may comprise any type of printed control board (PCB), a ceramic substrate, or other suitable substrate configuration. In some embodiments, the substrate 300 may be a thick film printed ceramic board, however other circuit board configurations may be utilized in other embodiments. In one example, the substrate 300 may be made, at least in part, of FR 4 laminate and/or other material. In various embodiments, the substrate 300 may have one or more electronic components secured to one or more surfaces thereof and or coupled to a pad positioned at a substrate surface for connecting the substrate 300 (e., the first substrate surface 301, the second substrate surface 302) to various electronic components utilized by the pressure sensor 10. In one example, the substrate 300 may include an application specific integrated circuit (ASIC) that may be attached to the substrate 300. Such an ASIC may be electrically connected to the substrate 300 via wire bonds and/or bump bonds, electrical terminals, any other suitable electrical connections, or the like. Additionally or alternatively, the substrate 300 may include one or more conductive pads for engaging circuitry and/or electronic components in communication with a remote processor or the like. In various embodiments one or more of the aforementioned substrate 300 may include a plurality of components disposed upon each of a first substrate surface 301 and a second substrate surface 302, so as to facilitate the electronic connection of various sensor components to each of the aforementioned opposite surfaces. In various embodiments, one or more surfaces of the substrate 300 may include a die coat material forming a protective layer configured to prevent physical interaction between a volume of fluid within the pressure sensor 10 and the various electrical components of the sensor 10 disposed on and/or within a surface of the substrate 300.

Further, in various embodiments, the substrate 300 may include one or more processing electronics and/or compensation circuitry (e.g., which may or may not include an ASIC). Such processing electronics may be electrically connected to terminals of one or both of a first pressure sensing element 120 and a second pressure sensing element 220, an ASIC (if present), and/or electrical terminals to process electrical signals from the pressure sensing elements 120, 220 and/or to transfer outputs from the respective pressure sensing elements 120, 220 to electronic components of one or more devices that may be used in conjunction with the pressure sensor 10. In some instances, the substrate 300 may include circuitry that may be configured to format one or more output signals provided by the pressure sensing element 300 into a particular output format. For example, circuitry of the substrate 300 (e.g., circuitry on one or more surfaces of the substrate 300) may be configured to format an output signal provided by each of one or more pressure sensing element 120, 220 into a ratio-metric output format, a current format, a digital output format and/or any other suitable format.

As described herein, in various embodiments, each of the distinct sensor portions 100, 200 arranged on opposing sides of the substantially planar substrate 300 of the exemplary pressure sensor 10 may comprise a pressure sensing assembly configured to detect a local pressure within the internal pressure chamber of the respective sensor portion 100, 200 (e.g., first internal pressure chamber 112, second internal pressure chamber 212). In various embodiments, a pressure sensing assembly may comprise a pressure sensing element, a force transmitting member, and a force transmitting member retainer configured to contain the force transmitting member. For example, as illustrated in FIGS. 2-3, an exemplary sensor portion (e.g., first sensor portion 100, second sensor portion 200) of the pressure sensor 10 may include a pressure sensing assembly attached to a corresponding surface of the substrate 300 and disposed at least partially within the corresponding sensor housing such that the pressure sensing assembly may detect a pressure with the internal pressure chamber of the sensor portion. As illustrated, the first sensor portion 100 may comprise a first pressure sensor assembly including a first pressure sensing element 120, a first force transmitting member retainer 130, and a first force transmitting member 140 disposed at least partially within the first sensor housing 110 and configured to detect a pressure within a first internal pressure chamber 112, as described herein. Further, the second sensor portion 200 may comprise a second pressure sensor assembly including a second pressure sensing element 220, a second force transmitting member retainer 230, and a second force transmitting member 240 disposed at least partially within the second sensor housing 210 and configured to detect a pressure within a second internal pressure chamber 212, as described herein.

In various embodiments, a pressure sensing element may be configured to detect a local pressure within an adjacent environment based at least in part on one or more forces transmitted from the local environment (either directly or indirectly) to the pressure sensing element. For example, a pressure sensing element may include a micro-machined piezoresistive pressure sense die having a sense diaphragm. A pressure sensing element may be configured in any manner and may have a first side (e.g., a front side) and a second side (e.g., a back side). As an illustrative example, FIG. 3 shows an exemplary pressure sensor 10 with a first sensor portion 100 including a first pressure sensing element having a first side 121 and a second side 122. For example, the first pressure sensing element 120 may be back-side mounted on a surface of substrate 300 (e.g., first substrate surface 301) with the second side of the first pressure sensing element 122 facing the substrate 300. In such an exemplary circumstance, a first pressure sensing element 120 may be configured to perform top-side sensing via the first side 121 thereof to sense a force initiated from within an adjacent environment and transmitted to the first side 121 of the pressure sensing element 120, such as, for example, a force generated by a local pressure within the first interior pressure chamber 112. For example, pressure sensor 10 may be configured such that the first pressure sensing element 120 may utilize top-side sensing when a sensed media either directly or indirectly (e.g., through the first force transmitting member 140 or other intermediary) interacts with a top side 121 of the pressure sensing element 120. For example, as described in further detail herein, the pressure sensing assembly of the first sensor portion 100 may include a first force transmitting member 140 that is physically engaged with the first side 121 of the first pressure sensing element 120 and configured to isolate the pressure sensing element from a pressurized volume of fluid within the first interior pressure chamber 112 such that a pressure force present within the first interior pressure chamber 112 may be transmitted to the pressure sensing element 120 (e.g., the first side 121) via the first force transmitting member 140. Back-side mounting the first pressure sensing element 120 to the first substrate surface 301 of the substrate may facilitate a robust first sensor portion 100 configuration because any sensed media (e.g., first force transmitting member 140) acting on the first pressure sensing element 120 may act to push the pressure sensing element 120 against the substantially rigid substrate 300. Although the first pressure sensing element 120 may be described herein as being back-side mounted to the first substrate surface 301, it is contemplated that the first pressure sensing element 120 may be mounted in one or more other configurations relative to the substrate 300.

The exemplary pressure sensor 10 illustrated in FIG. 3 further includes a second sensor portion 200 including a second pressure sensing element 220 having a substantially similar configuration to that of the first pressure sensing element 120, described above. For example, the second pressure sensing element 220 may have a first side 221 and a second side 222. The second pressure sensing element 220 may be back-side mounted on a surface of substrate 300 (e.g., second substrate surface 302) with the second side of the second pressure sensing element 222 facing the substrate 300. In such an exemplary circumstance, a second pressure sensing element 220 may be configured to perform top-side sensing via the first side 221 thereof to sense a force initiated within an adjacent environment and transmitted to the first side 221 of the second pressure sensing element 220, such as, for example, a force generated by a local pressure within the second interior pressure chamber 212. For example, pressure sensor 10 may be configured such that the second pressure sensing element 220 may utilize top-side sensing when a sensed media either directly or indirectly (e.g., through the second force transmitting member 240 or other intermediary) interacts with a top side 221 of the second pressure sensing element 220. For example, as described in further detail herein, the pressure sensing assembly of the second sensor portion 200 may include a second force transmitting media 240 that is physically engaged with the first side 221 of the second pressure sensing element 220 and configured to isolate the pressure sensing element 220 from a pressurized volume of fluid within the second interior pressure chamber 212 such that a pressure force present within the second interior pressure chamber 212 may be transmitted to the second pressure sensing element 220 (e.g., the first side 221) via the second force transmitting member 240. Back-side mounting the second pressure sensing element 220 to the second substrate surface 302 of the substrate 300 may facilitate a robust second sensor portion 200 configuration because any sensed media (e.g., second force transmitting member 240) acting on the second pressure sensing element 220 may act to push the pressure sensing element 220 against the substantially rigid substrate 300. Although the second pressure sensing element 220 may be described herein as being back-side mounted to the second substrate surface 302, it is contemplated that the second pressure sensing element 220 may be mounted in one or more other configurations relative to the substrate 300.

In various embodiments, a pressure sensing element 120, 220 may be electrically connected to the substrate 300 in various manners. For example, wire bonds may be utilized to electrically connect a pressure sensing element 120, 220 to the substrate 300, such as, for example, a surface of the substrate 300 to which the second side 122, 222 of the pressure sensing element 120, 220 is physical engaged. The wire bonds may have a first end connected to a bond pad of the pressure sensing element 120, 220 and another end connected to a bond pad of the substrate 300. Additionally or alternatively, a pressure sensing element 120, 220 may be electrically connected to the substrate 300 via bump bonds and/or in any other suitable manner.

In various embodiments, the first and second pressure sensing assemblies of the first and second sensor portions 100, 200, respectively, may each further comprise a force transmitting member retainer configured to retain the force transmitting media within one or more retainer sidewalls in a position engaged with the pressure sensing element of the assembly. A force transmitting member retainer may embody a housing element configured to at least partially contain the force transmitting member by preventing the force transmitting member from moving relative thereto in at least one direction. A force transmitting member retainer may comprise at least one retainer sidewall that extends from a surface of substrate 300 away from the substrate and into an adjacent interior pressure chamber. For example, a retainer sidewall may extend from a first sidewall end disposed at least substantially adjacent a surface of substrate 300, to a second sidewall end disposed within an interior pressure chamber at a distance (e.g., measured perpendicularly) away from the aforementioned substrate surface. In various embodiments, the retainer sidewall of a force transmitting member retainer may be arranged about a substrate 300 surface so as to least partially circumferentially surround and/or enclose a corresponding pressure sensing element and/or the force transmitting member engaged therewith, as described herein. In various embodiments, the force transmitting member retainer may be attached to at least a portion of the substrate 300 along at least a portion of the first end of the retainer sidewall. As a non-limiting example, the retainer sidewall may be coupled to a surface of substrate 300 using an adhesive, such as, for example, a food-grade adhesive, an epoxy, and/or any other suitable means of adhering the various components of the sensor to one another. In various embodiments, a retainer sidewall may extend about a surface of the substrate 300 so as to circumferentially surround a pressure sensing element secured thereto. In such an exemplary configuration, the force transmitting member retainer may be secured to the substrate so as to define a sealed interface at the substrate surface along the first end of the retainer sidewall. Such a sealed configuration may facilitate the fluid isolation of at least a portion of the substrate surface from a volume of fluid present within the interior pressure chamber.

As an illustrative example, the first sensor portion 100 illustrated in FIGS. 2-3 comprises a first force transmitting member retainer 130 defined in part by a retainer sidewall that extends from a first sidewall end attached to the first substrate surface 301 to a second sidewall end disposed within the first interior pressure chamber 112 at a distance away from the first substrate surface 301. The sidewall of the first force transmitting member retainer 130 extends about the first substrate surface 301 so as to circumferentially surround the first pressure sensing element 120 secured thereto. Further, as illustrated, the first sensor portion 100 includes a first adhesive layer 131 positioned between the first substrate surface 301 and the first force transmitting member retainer 130. The first adhesive layer 131 is configured to secure the first force transmitting member retainer 130 to the first substrate surface 301 so as to define a fluid-tight seal that extends along the entirety of the interface between the first force transmitting member retainer 130 and the first substrate surface 301. In such an exemplary configuration, the sealed interface between the first force transmitting member retainer 130 and the first substrate surface 301—in combination with the physical barrier provided by the force transmitting member 140, as described in further detail herein—serves to fluidly isolate the first substrate surface 301 from the first interior pressure chamber 112 in order to prevent a volume of fluid present within the first interior pressure chamber 112 from physically contacting the first substrate surface 301, which can lead to decreased sensor performance and/or various mechanical failures.

The exemplary pressure sensor 10 illustrated in FIGS. 2-3 further includes a second sensor portion 200 including a second force transmitting member retainer 230 having a substantially similar configuration to that of the first force transmitting member retainer 130, described above. For example, the second force transmitting member retainer 230 includes a retainer sidewall that extends from a first sidewall end attached to the second substrate surface 302 to a second sidewall end disposed within the second interior pressure chamber 212 at a distance away from the second substrate surface 302. The sidewall of the second force transmitting member retainer 230 extends about the second substrate surface 302 so as to circumferentially surround the second pressure sensing element 220 secured thereto. Further, as illustrated, the second sensor portion 200 includes a second adhesive layer 231 positioned between the second substrate surface 302 and the second force transmitting member retainer 230. The second adhesive layer 231 is configured to secure the second force transmitting member retainer 230 to the second substrate surface 302 so as to define a fluid-tight seal that extends along the entirety of the interface between the second force transmitting member retainer 230 and the second substrate surface 302. As described with respect to the first adhesive layer 131, the sealed interface between the second force transmitting member retainer 230 and the second substrate surface 302—in combination with the physical barrier provided by the second force transmitting member 240, as described in further detail herein—serves to fluidly isolate the second substrate surface 302 from the second interior pressure chamber 212 in order to prevent a volume of fluid present within the second interior pressure chamber 212 from physically contacting the second substrate surface 302.

In various embodiments, the first and second pressure sensing assemblies of the first and second sensor portions 100, 200, respectively, may each further comprise a force transmitting member configured to facilitate the transfer of a force resulting from a local pressure within an interior pressure chamber to a pressure sensing element configured to detect the pressure within the interior pressure chamber. A force transmitting member may be disposed within a force transmitting member retainer so as to substantially isolate both the surface the pressure sensing element from the volume of fluid may fill or at least partially fill the opening and/or reservoir with the retainer sidewall of the force transmitting member retainer. For example, a force transmitting member may comprise a first end and a second end, wherein the first end may be configured to physically engage with first side of a pressure sensing element and the second end may be arranged within the force transmitting member retainer adjacent a second sidewall end thereof such that the second end of the force transmitting member may directly interface with a volume of fluid present within the adjacent interior pressure chamber. In various embodiments, a force transmitting member may be configured to facilitate transferring a force interacting with the second end of the force transmitting member to a portion of a pressure sensing element engaged with the first end of the force transmitting member. For example, a force transmitting member may receive at a second end thereof a pressure force caused by the volume of fluid within the interior pressure chamber and facilitate the transfer of the pressure force to the top side of the pressure sensing element. In such an exemplary configuration, a force experienced by the pressure sensing element (e.g., via the force transmitting member) may arise due to a local pressure caused by a volume of fluid disposed within the corresponding interior pressure chamber. As described herein, the pressure associated with the volume of fluid with the interior pressure chamber may correspond to a pressure within an ambient environment to which the interior pressure chamber is fluidly connected.

In various embodiments, a force transmitting member may be formed from one or more layers of material. For example, the force transmitting member may be formed from one layer of material, two layers of material, three layers of material, four layers of material, six layers of material, nine layers of material, or other number of layers of material. An exemplary force transmitting member may be made from any suitable material. For example, in various embodiments, a force transmitting member may comprise a dielectric material, a non-compressible material, a biocompatible material, colored material, non-colored material, and/or one or more other types of material. Further, in various embodiments, a force transmitting member described herein may comprise a gel (e.g., a fluorosilicone gel), a resilient material such as a cured silicone rubber or silicone elastomer, a cured liquid silicone rubber, an oil and/or the like. As a non-limiting example, the force transmitting member may comprise a food-grade gel. In various embodiments, a force transmitting member may include a biocompatible material such as, for example, a cured silicone elastomer. In various embodiments wherein the force transmitting member comprises a gel, a pressure sensing assembly may further include a membrane configured to cover the entirety of the opening defined by the second sidewall end of a corresponding force transmitting member retainer so as to contain the gel in the reservoir defined by the space within the retainer sidewall extending between the substrate 300 and the second end of the retainer sidewall.

As illustrated in the exemplary pressure sensor 10 embodiment shown in FIGS. 2-3, the first sensor portion 100 may comprise a first force transmitting member 140 disposed within the first force transmitting member retainer 130, and the second sensor portion 200 may comprise a second force transmitting member 240 disposed within the second force transmitting member retainer 230. For example, the first and second force transmitting members 140, 240 may each fill the space within the respective force transmitting member retainers 130, 230 so as to extend from a surface of the substrate 300 to the second end of the corresponding retainer sidewall. As illustrated, the first force transmitting member 140 and the second force transmitting member 240 each include a receiving surface positioned adjacent the first interior pressure chamber 112 and the second interior pressure chamber 212, respectively, such that each receiving face is configured to receive a pressure force generated by the volume of fluid within the respective interior pressure chamber. In various embodiments, a receiving face of a force transmitting member 140, 240 may be, for example, either a flat, convex, or concave surface configured to face away from the substrate 300. Further, in various embodiments, a receiving face of a force transmitting member 140, 240 may comprise a surface area of at least approximately between 0.05 cm$^2$ and 5 cm$^2$ (e.g., between 0.112 cm$^2$ and 2.8 cm$^2$). The first and second sensor portions 100, 200 may be configured such that the respective forces received by the first and second force receiving members 140, 240 is applied to the force receiving members (e.g., at the respective receiving faces) in a direction extending from the interior pressure chamber substantially toward the substrate 300.

In various embodiments, the first and second force transmitting members 140, 240 may be configured to facilitate transferring the forces received from the first and second interior pressure chambers 112, 212 to the first pressure sensing element 120 and the second pressure sensing element 220 respectively engaged therewith. In such an exemplary configuration, as illustrated in FIGS. 2-3, the first and second pressure sensing elements 120, 220 may be configured to receive the force transferred from the corresponding force transmitting member engaged therewith and sense the received force, as described herein, so as detect a local pressure within the corresponding interior pressure chamber 112, 212. For example, as described herein, the force experienced by a pressure sensing element 120, 220 may result in a variance in an output voltage produced by the pressure sensing element 120, 220. As illustrated, in an exemplary embodiment wherein the first and second force transmitting members 140, 240 each comprise a gel, both the first pressure assembly and the second pressure assembly may further include a membrane extending across the opening defined at the second sidewall ends of the first and second force transmitting member retainers 130, 230 so as to retain each gel within the respective retainers. In such an exemplary configuration, the membranes may each be configured to directly interface with a volume of fluid present within the adjacent interior pressure chamber 112, 212.

In various embodiments, the pressure sensor 10 may further comprise a controller 400 that is electronically connected to both the first pressure sensing element 120 of the first sensor portion 100 and the second pressure sensing element 120 of the second sensor portion 200. As illustrated in FIGS. 2-3, in various embodiments, the controller 400 may be secured to a surface of the substrate 300 within one of the first sensor portion and the second sensor portion. In such an exemplary configuration, the pressure sensor 10 may comprise one or more electrical VIAS 310 configured to extend between the first substrate surface 301 and the second substrate surface 302 in order to facilitate electrical communication between various electronic components and/or circuitries of the pressure sensor 10 disposed about opposite surfaces of the substrate 300. For example, in various embodiments, as described herein, the pressure sensor 10 includes both a first pressure sensing assembly comprising a first pressure sensing element 120 physically secured and electronically connected to the first substrate surface 301 of substrate 300, and a second pressure sensing assembly comprising a second pressure sensing element 220 physically secured and electronically connected to the opposite side of the substrate 300, defining the second substrate surface 302. In such an exemplary configuration the one or more electrical VIAS 310 may establish electronic communication between the controlled 400 and various electronic sensor components arranged on opposing sides of the substrate 300. The one or more electrical VIAS 310 extending through the thickness of the substrate 300 facilitate the transmission of output signals from each of the first and second pressure sensing elements 120, 220 to the controller 400.

In various embodiments, one or more of the first pressure sensing element 110 and the second pressure sensing element 220 may be configured to receive a power signal from the controller 400. For example, in various embodiments, the one or more pressure sensing element 120, 220 may be powered at a voltage of between 1.5 volts and 24 volts (e.g., 5 volts). In various embodiments, a pressure sensing element 120, 220 electronically connected to the controller 400 may be configured to transmit an output signal to the controller 400 upon sensing a pressure signal, such as, for example, a baseline pressure value and/or a pressure variance within an interior pressure chamber 112, 212 corresponding thereto.

In various embodiments, power may be supplied to controller 140 to enable distribution of power to the various components described herein. In some embodiments, each of the components of the pressure sensor 10 may be connected to controller 400 (e.g., for electronic communication), which may be configured to facilitate communication and functional control therebetween. In various embodiments, the controller 400 may comprise one or more of a processor, memory, a communication module, an on-board display, and signal analysis circuitry. In various embodiments, the controller 400 may be configured to power one or more of the pressure sensing elements 110, 220 and/or receive an output signal from one or more of the first pressure sensing element 110 and the second pressure sensing element 220. In various embodiments, the controller 400 output signals (e.g., calculated pressure differential values, raw pressure sensing element output signals, and/or the like) to external components via universal serial bus (USB) or any other wired connection. In various embodiments, an on-board display may be configured to display a variety of signals and/or data transmitted from, received by, and/or determined by the controller 400. In various embodiments, the controller may be embodied as a single chip (e.g., a single integrated-circuit chip) configured to provide power signals to various electrical components of the pressure sensor 10, to receive and process output signals from both the first pressure sensing element 120 and the second pressure sensing element 220—corresponding to the local pressure within the first interior pressure chamber 112 and the second interior pressure chamber 212, respectively—and/or to compensate for any detected changes in environmental factors such as, for example, temperature, flow, or pressure within one or more of a first sensor portion, a second sensor portion, a first ambient environment, a second ambient environment, a first fluid supply, a second fluid supply.

In various embodiments, the controller 400 may be configured to communicate with a variety of external devices via Bluetooth™, Bluetooth Low Energy (BTLE), Wi-Fi™, or any other wireless connection. The controller 400 may be configured so as to enable wireless communication within an Internet-of-Things (IoT) network to a variety of wirelessly enabled devices (e.g., a user mobile device, a server, a computer, and/or the like).

In various embodiments, the controller 400 may comprise signal analysis circuitry, which may be configured to determine a pressure differential value as measured between the first sensor portion 100 and the second sensor portion 200 at one or more instances based at least in part on at least one output signals received from each of the first pressure sensing element 120 and the second pressure sensing element 220. For example, the signal analysis circuitry may receive a first output signal from the first pressure sensing element 120 and may further receive a second output signal from a second pressure sensing element 220. In various embodiments, the signal analysis circuitry may be configured to analyze the output signals received from the pressure sensing elements 120, 220—and as well as any available contextual data corresponding thereto—and further to execute an output transfer function relating the first output signal to the second output signal to determine the pressure differential output value based at least in part on, for example, one or more of the first output signal (e.g., the digital output counts of the first pressure sensing element 120 with respect to the pressure at a first fluid inlet 111), the second output signal (e.g., the digital output counts of the second pressure sensing element 220 with respect to the pressure at a second fluid inlet 111), a differential pressure range, a first pressure range associated with the first pressure sensing element 120, and outputs of the first pressure sensing element 120 at both a low pressure and a high pressure. Alternatively, the pressure differential output value may be similarly determined using a second pressure range associated with the second pressure sensing element 220, and outputs of the second pressure sensing element 220 at both a low pressure and a high pressure, instead of the aforementioned first pressure range associated with the first pressure sensing element 120, and outputs of the first pressure sensing element 120 at both the low pressure and the high pressure.

In various embodiments, the signal analysis circuitry of a controller of the pressure sensor 10 described herein may be configured to utilize one or more output transfer functions to determine at least one pressure sensor output value, such as, for example, a pressure differential value. As a non-limiting, illustrative example, the signal analysis circuitry of controller 400 may be configured to use the following relationship to determine the output of the pressure sensor 10, wherein $O_{Sensor1}$ represents a first output signal (e.g., the digital output counts of the first pressure sensing element 120 with respect to the pressure at a first fluid inlet 111), $O_{Sensor2}$ represents the second output signal (e.g., the digital output counts of the second pressure sensing element 220 with respect to the pressure at a second fluid inlet 211), P Range$_{Sensor1}$ represents a pressure range of the first pressure sensing element 120, P Range$_{Differential}$ represents a differential pressure range, $O_{Sensor\ 1}^{Low\ P}$ represents an output of the first pressure sensing element 120 at a high pressure, and $O_{Sensor\ 1}^{Low\ P}$ represents an output of the first pressure sensing element 120 at a low pressure:

$$(O_{Sensor1} - O_{Sensor2}) * \left(\frac{P\,\text{Range}_{Sensor1}}{P\,\text{Range}_{Differential}}\right) + \frac{(O_{Sensor1}^{Low\ P} + O_{Sensor1}^{High\ P})}{2} = O_{Total}$$

As a non-limiting, illustrative example, in an exemplary circumstance wherein a differential sensor requirement is 100 PSI, the first and second pressure sensing elements 120, 220 are each calibrated to approximately 115 PSIA. In an exemplary circumstance a first fluid supply provides 115 PSIA at the first fluid inlet 111 and the second fluid supply is open to an ambient pressure of approximately 15 PSIA at the second fluid inlet 211. Further the exemplary pressure sensor 10 is configured such that the first pressure sensing element 120 and the second pressure sensing element 220 are calibrated to 10% to 90% of $2^{24}$ (i.e. 2^24) counts over 0 to 115 PSIA. Further, in such an exemplary circumstance, the differential pressure range calibration requirement may be 10% to 90% of $2^{24}$ (i.e. 2^24) counts over −100 PSI to 100 PSI. In such an exemplary circumstance, $O_{Sensor1}$ may be at least substantially equal to 90% of $2^{24}$ (i.e. 2^24) counts, and $O_{Sensor2}$ may be at least substantially equal to 20.4348% of $2^{24}$ (i.e. 2^24) counts. Accordingly, based at least in part on the illustrative values described above, the output transfer function equation provided above may be used to determine an output differential value of 100 PSI in the above-described exemplary circumstance.

The use of the term "circuitry" as used herein with respect to components of the fluid sensor 10 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the controller 140 may provide or supplement the functionality of particular circuitry. For example, the processor may provide processing functionality, memory may provide storage functionality, and communication module may provide network interface functionality, among other features.

In various embodiments, as described herein, the pressure sensor 10 may be configured to determine a pressure differential between a first fluid source and a second fluid source based at least in part on the local pressures within a first interior pressure chamber and a second interior pressure chamber, as detected by a first pressure sensing element and a second pressure sensing element, respectively. For example, as illustrated in FIGS. 2-3, the pressure sensor may comprise a first sensor portion 100 and a second sensor portion 200 respectively disposed on opposing sides of a substrate 300. As described herein, the first sensor housing 110 of the first sensor portion 100 comprises a fluid inlet 111 that is fluidly connected to a first fluid supply, such as, for example, a first ambient environment or a first fluid source, configured to provide a volume of fluid (e.g., coffee, water, milk, beer, soda, air, and/or the like) through the fluid inlet 111 and into the first interior pressure chamber 112. As described herein, the first sensor housing 110 and/or an adhesive layer 131 secured to a portion of a first pressure sensing assembly (e.g., the first force transmitting member retainer 130) may be configured so as to define a fluid-tight seal along the entirety of the outer portions of the first interior pressure chamber 112 (e.g., along the entirety of the various interfaces securing the first substrate surface 301, the first adhesive layer 131, the first force transmitting member retainer 130, and the first sensor housing 110 relative to one another) such that the fluid inlet 111 defines the only path of fluid communication between the first interior pressure chamber 112 and a first fluid source and/or an ambient environment (e.g., via leakage). Accordingly, the first sensor portion 100 may be configured to receive a volume of fluid from the first fluid source until the local pressure within the within the first interior pressure chamber 112 is at least substantially equivalent to that of the first fluid source.

In such an exemplary configuration, a first force receiving member 140 (e.g., a receiving face of the first force receiving member 140) is interfaced with the pressurized volume of fluid within the first interior pressure chamber 112 such that pressure within the interior pressure chamber 112 may exert a force onto the first force transmitting member 140 and/or a membrane 141 positioned directly adjacent thereto, as described herein. The force transmitting member 140 is configured such that the force exerted thereon by the local pressure within the first interior pressure chamber 112 is transferred to a first pressure sensing element 120 attached to a first substrate surface 301 of the substrate 300. As described herein, the first force transmitting member 140 may comprise, for example, a gel. In response to sensing the force received from the force transmitting member 140, the first pressure sensing element 120 is configured to generate a first output signal that may be defined at least in part by a magnitude of the first local pressure within the first interior pressure chamber 112.

Further, the second sensor portion 200 of the pressure sensor 10 may comprise a similar configuration, wherein the second sensor housing 210 of the second sensor portion 200 comprises a fluid inlet 211 that is fluidly connected to a second fluid supply, such as, for example, a second ambient environment or a second fluid source, configured to provide a volume of fluid through the fluid inlet 211 and into the second interior pressure chamber 212. As described herein, the second sensor housing 210 and/or a second adhesive layer 231 secured to a portion of a second pressure sensing assembly (e.g., the second force transmitting member retainer 230) may be configured so as to define a fluid-tight seal along the entirety of the outer portions of the second interior pressure chamber 212 (e.g., along the entirety of the various interfaces securing the second substrate surface 302, the second adhesive layer 231, the second force transmitting member retainer 230, and the second sensor housing 210 relative to one another) such that the second fluid inlet 211 defines the only path of fluid communication between the second interior pressure chamber 212 and a second fluid source and/or an ambient environment (e.g., via leakage). Accordingly, the second sensor portion 200 is configured to receive a volume of fluid from the second fluid source until the local pressure within the within the second interior pressure chamber 212 is at least substantially equivalent to that of the second fluid source. As described above, the second sensor portion 200 is further configured such that such that the local pressure within the second interior pressure chamber 212 may exert a force onto the second force transmitting member 240 and/or a membrane 241 positioned directly adjacent thereto, as described herein. The second force transmitting member 240 is configured such that the force exerted thereon by the local pressure within the second interior pressure chamber 212 is transferred to a second pressure sensing element 220 disposed about a second substrate surface 302 of the substrate 300. As described herein, the second force transmitting member 240 may comprise, for example, a gel. In response to sensing the force received from the second force transmitting member 240, the second pressure sensing element 220 is configured to generate a second output signal that may be defined at least in part by a magnitude of the second local pressure within the second interior pressure chamber 212.

In various embodiments, a change in pressure at a first fluid supply and/or a second fluid supply may result in a change of pressure within the respective sensor portion 100, 200 (e.g., within the first interior pressure chamber 112, within the second interior pressure chamber 212) fluidly connected thereto, and thus, a change in force being exerted on the receiving face of the corresponding force transmitting member 140, 240 and, in turn, a change in force being sensed by a corresponding pressure sensing element 120, 220. The change in force arising from a change in pressure at a fluid supply (and thus, within an interior pressure chamber 112, 212 in fluid communication therewith) may define a low frequency event received by and transmitted through a force transmitting member 140, 240 such that it may be sensed by the respective pressure sensing element 120, 220 engaged therewith. In various embodiments, a low frequency event experienced by a pressure sensing element 120, 220 may be detected as a shift in signal detected by the pressure sensing element 120, 220 (e.g., correlating to a DC shift). As described in further detail herein, in various embodiments, the first pressure sensing element 120 of the first sensor portion 100 and the second pressure sensing element 220 of the second pressure sensing portion 200 may each be in electronic communication with a controller 400 such that each may transmit respective output signals corresponding to local pressures within the corresponding interior pressure chambers 112, 212 to the controller 400.

Figure 4:
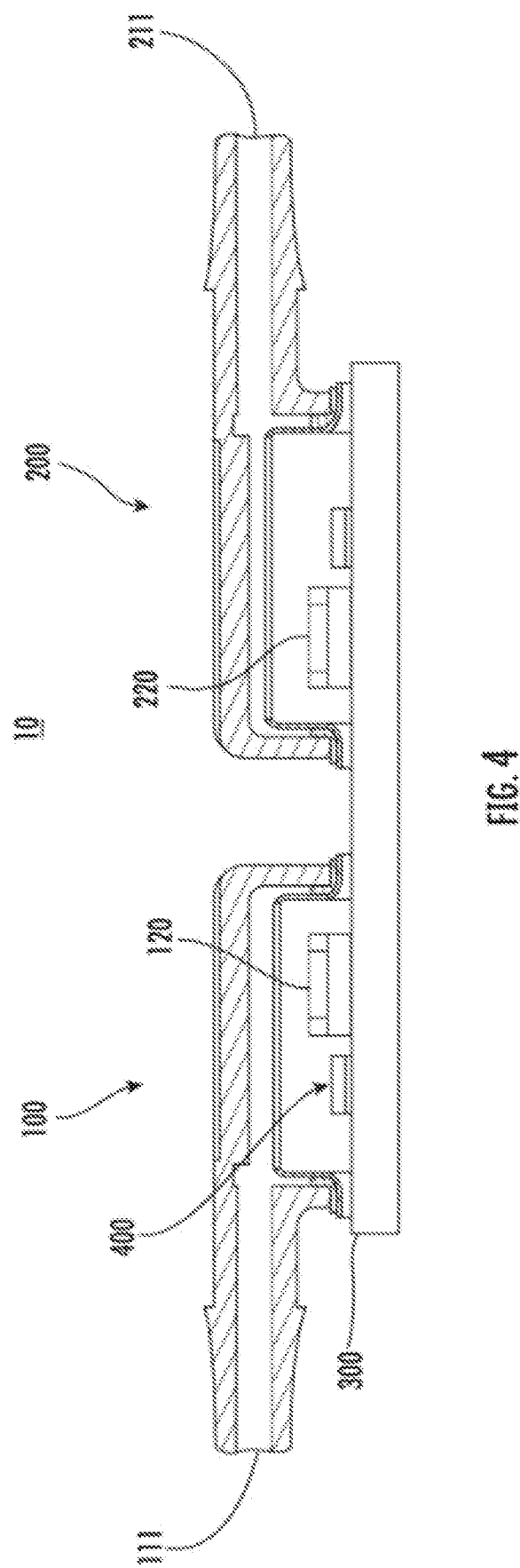
FIG. 4 illustrates a cross-sectional view of an exemplary pressure sensor according to an embodiment.

In various embodiments, as illustrated in FIG. 4, an exemplary pressure sensor 10 may be configured such that a first sensor portion 100 and a second sensor portion 200 are laterally distanced apart and positioned along the same substrate surface of substrate 300. In such an exemplary configuration, the substrate 300 may define a portion of each of the first and the second sensor portions 100, 200 and may function as a barrier configured to fluidly isolate the first sensor portion 100 from the second sensor portion 200. The first and second sensor portions 100, 200 may respectively comprise a first fluid inlet 111 configured to receive a volume of fluid from a first fluid supply and a second fluid inlet 211 configured to receive a volume of fluid from a second fluid supply. Such an exemplary configuration may facilitate a substantially flat (e.g., thin) sensor profile while facilitating the detection of the respective pressures of the first and second fluid supplies and determine a comparative pressure differential that exists therebetween.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of determining a pressure differential, the method comprising:
    providing a pressure sensor comprising:
        a substrate defining a first substrate surface and a second substrate surface;
        a first pressure sensing assembly attached to the first substrate surface and configured to detect a first pressure force associated with a first volume of fluid, wherein at least a portion of the first substrate surface to which the first pressure sensing assembly is attached is fluidly isolated from the first volume of fluid by a first force transmitting member retainer, wherein the first force transmitting member retainer extends from the first substrate surface; and
        a second pressure sensing assembly attached to the second substrate surface and configured to detect a second pressure force associated with a second volume of fluid, wherein at least a portion of the second substrate surface to which the second pressure sensing assembly is attached is fluidly isolated from the second volume of fluid by a second force transmitting member retainer, wherein the second force transmitting member retainer extends from the second substrate surface; and
    determining a pressure differential based at least in part on the first pressure force and the second pressure force, wherein the first substrate surface and the second substrate surface define opposing ends of a thickness of the substrate.

2. The method of claim 1, wherein the first substrate surface and the second substrate surface define coplanar surfaces such that the first pressure sensing assembly and the second pressure sensing assembly are laterally distanced apart within an at least substantially similar plane.

3. The method of claim 1, further comprising receiving a first output signal from the first pressure sensing assembly and a second output signal from the second pressure sensing assembly and determining the pressure differential based at least in part on the first output signal and the second output signal.

4. The method of claim 1, wherein the first pressure sensing assembly comprises a first pressure sensing element positioned at least substantially adjacent the first substrate surface and configured to detect the first pressure force; and wherein the second pressure sensing assembly comprises a second pressure sensing element positioned at least substantially adjacent the second substrate surface and configured to detect the second pressure force.

5. The method of claim 1, wherein the first pressure sensing assembly comprises a first force transmitting member disposed within a first sensor housing and configured to receive the first pressure force; and wherein the second pressure sensing assembly comprises a second force transmitting member disposed within a second sensor housing and configured to receive the second pressure force.

6. The method of claim 5, wherein the first force transmitting member comprises a first volume of gel; and wherein the second force transmitting member comprises a second volume of gel.

7. The method of claim 6, wherein the first volume of gel comprises a food-grade gel; and wherein the first sensor housing is secured relative to the first substrate surface using a food-grade adhesive.

8. The method of claim 1, wherein a portion of the first pressure sensing assembly defining a first pressure port and a portion of the second pressure assembly defining a second pressure port.

9. The method of claim 1, wherein the substrate comprises a printed control board (PCB).

10. The method of claim 1, wherein the first pressure sensing assembly comprises a first pressure sensing element in electronic communication with the first substrate surface and configured to detect the first pressure force; and wherein the second pressure sensing assembly comprises a second pressure sensing element in electronic communication with the second substrate surface and configured to detect the second pressure force.

11. The method of claim 10, wherein the first pressure sensing element is configured to receive the first pressure force at a first receiving surface, and wherein the second pressure sensing element is configured to receive the second pressure force at a second receiving surface.

12. The method of claim 11, wherein the first receiving surface is arranged so as to face a substantially opposite direction as the second receiving surface.

13. The method of claim 1, further comprising defining a first internal pressure chamber configured to house the first volume of fluid; and defining a second internal pressure chamber configured to house the second volume of fluid.

14. The method of claim 1, wherein the first pressure sensing assembly further comprises a first pressure sensing element disposed within a first sensor housing, wherein the first force transmitting member is configured to transfer at least a portion of the first pressure force to the first pressure sensing element, and wherein the first force transmitting member is configured to at least substantially surround the first pressure sensing element so as to fluidly isolate the first pressure sensing element from the first volume of fluid.

15. The method of claim 1, wherein the second pressure sensing assembly further comprises a second pressure sensing element disposed within a second sensor housing, wherein the second force transmitting member is configured to transfer at least a portion of the second pressure force to the second pressure sensing element, and wherein the second force transmitting member is configured to at least substantially surround the second pressure sensing element so as to fluidly isolate the second pressure sensing element from the second volume of fluid.

16. The method of claim 1, wherein the first and the second force transmitting member retainers are configured to retain a force transmitting media within one or more retainer sidewalls in a position engaged with the pressure sensing element of the assembly.

17. A pressure sensor comprising:
 a substrate defining a first substrate surface and a second substrate surface;
  a first pressure sensing assembly attached to the first substrate surface, wherein at least a portion of the first substrate surface to which the first pressure sensing assembly is attached is fluidly isolated from a first volume of fluid by a first force transmitting member retainer, wherein the first force transmitting member retainer extends from the first substrate surface; and
  a second pressure sensing assembly attached to the second substrate surface, wherein at least a portion of the second substrate surface to which the second pressure sensing assembly is attached is fluidly isolated from a second volume of fluid by a second force transmitting member retainer, wherein the second force transmitting member retainer extends from the second substrate surface:
  wherein the first substrate surface and the second substrate surface define opposing ends of a thickness of the substrate.

18. The pressure sensor of claim 17, wherein a portion of the first pressure sensing assembly defining a first pressure port and a portion of the second pressure assembly defining a second pressure port.

19. The pressure sensor of claim 17, wherein the first and the second force transmitting member retainers are configured to retain a force transmitting media within one or more retainer sidewalls in a position engaged with a pressure sensing element of the assembly.

* * * * *